R & T Winans,
Ship's Form.
No. 651. Reissued Jan. 25. 1859.
Fig: 1.
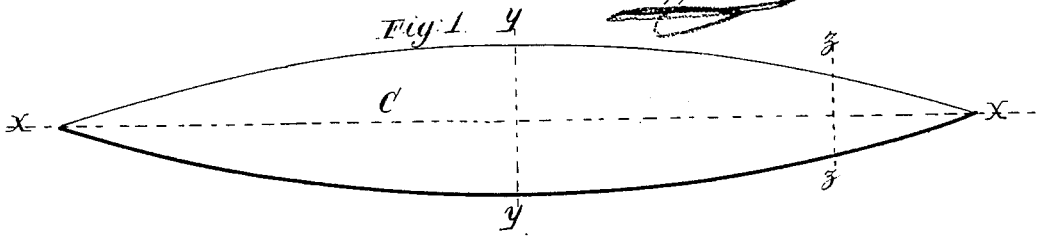
Fig: 2.
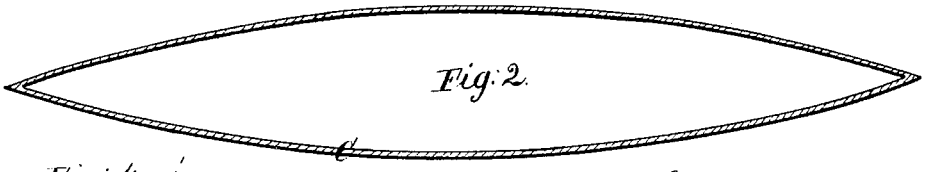
Fig: 4.
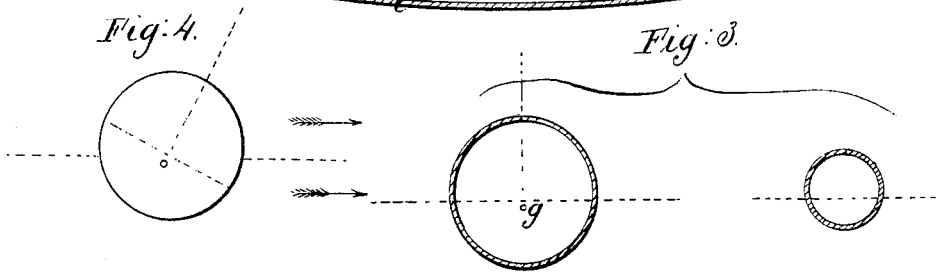
Fig: 3.
Fig: 6
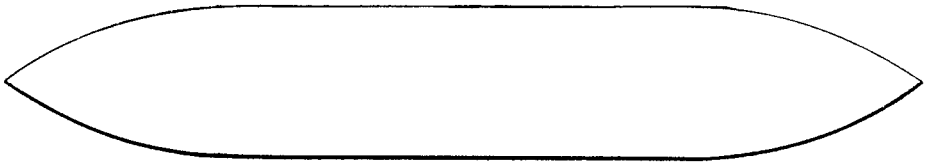
Fig: 5.
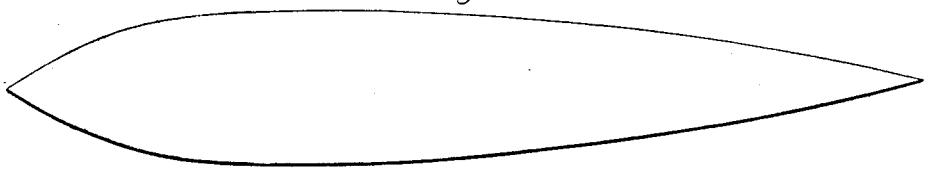
Fig: 7.
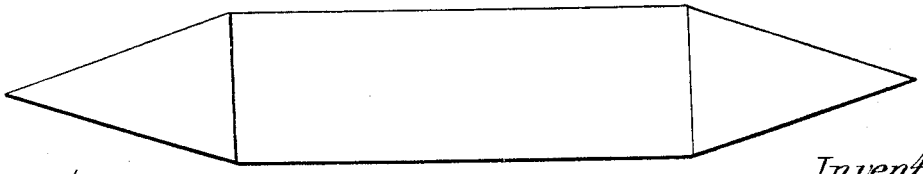
Witnesses;
D H Ludson
Geo Beckenbaugh
Inventor;
R & T Winans
Thomas Swan am

UNITED STATES PATENT OFFICE.

ROSS WINANS AND THOMAS WINANS, OF BALTIMORE, MARYLAND.

IMPROVEMENT IN HULLS OF STEAM VESSELS.

Specification forming part of Letters Patent No. 21,917, dated October 26, 1858; Reissue No. 651, dated January 25, 1859.

*To all whom it may concern:*

Be it known that we, ROSS WINANS and THOMAS WINANS, of the city and county of Baltimore, in the State of Maryland, have invented a new and useful Improvement in the Form of the Hulls of Steam-Vessels; and we do hereby declare that the following is a full, clear, and exact description of the same, reference being had to the accompanying drawings, which make part of this specification, and in which—

Figure 1 represents a plan of the hull of a vessel of our improved form. Fig. 2 represents a longitudinal section at the line *x x* of Fig. 1. Fig. 3 represents transverse sections at the lines *y y* and *z z* of Fig. 1; Figs. 4, 5, 6, and 7, details to be referred to hereinafter.

The shape of the steamships heretofore constructed has been such that when changing from an upright to an inclined position different figures, and consequently varying resistances, are presented to the action of the wind and waves, respectively, which tend to keep the vessel constantly rolling.

The object of our invention is to diminish this variation of resistance to the winds and waves which causes a vessel to roll, and also to diminish those resistances which prevent the vessel when "careened," or inclined to one side, from "righting" or returning to its normal upright position, while at the same time we obtain increased strength and stowage, and a capacity for greater average speed. We accomplish these objects by giving to the hull such a form that the transverse section of the exterior in any part will be represented by a circle.

The form of hull which we propose for our vessel is that of an elongated pointed spindle, which may be constructed of any suitable materials and with any kind of framing that may be deemed advisable. At every point in its length the cross-section of the hull is a circle, as shown in Fig. 3, and its longitudinal axial section, taken in any direction, is formed of two arcs of a circle, as shown in Figs. 1 and 2. Such a hull when loaded may be immersed to or nearly up to the axis of the spindle.

In an application for another patent made simultaneously with the application for this we have described the arrangement of a propelling-wheel which we consider to be the most advantageous for use with the spindle-shaped hull; but the kind of propeller used or its position may be varied at the discretion of the constructor. The stability necessary for a vessel of this form when unloaded may be given to it by placing the machinery at a point low in the vessel, or by ballast, or by both combined, as may be deemed most convenient or advantageous. When loading, the center of gravity of the entire mass will be lowered, as in ordinary vessels, and any requir- degree of stability may be given by a proper distribution of the cargo. If by rolling the position of the vessel should be changed so that the normally-vertical line (shown in Fig. 3) passing through its center should become inclined, as shown in Fig. 4, it is obvious that, the section being a circle, there will still be the same symmetrical figure presented to the action of the winds or waves, and the center of gravity, having been raised, as indicated in Fig. 4, will tend to fall back to its normal position, as shown in Fig. 3, with no other resistance than the mere friction of the surface of the vessel against the air and water in which it rolls. There is little, therefore, to prevent the vessel from resuming its upright position, when diverted from it, and there is, for the same reason, but little to cause it to deviate from the upright position. The winds or the waves acting upon the sides in the direction shown by the arrows in Fig. 3 would meet with the least possible resistance which the same sectional area could be made to present, and glancing from the round surface of the vessel, would produce the least possible effect. The action of the waves from beneath, as they rise and fall, would in like manner meet in any position of the vessel, the same figure of resistance, and therefore would not tend to turn it one way more than another, except so far as might arise from the mere friction of the water against the sides. These advantages cannot be attained in a vessel of ordinary construction which presents a large area of surface comparatively plane, especially to the wind.

The advantage derived from the transverse section of the vessel, being at all points circular, has an effect upon the progress of the vessel equally favorable, for as the end of the spindle advances through the water, no matter what may be the position of the vessel, (even if it should roll,) the same form will be constantly exposed to the water beneath, to the waves on the surface, and to the wind. From this uniformity of figure arising from equal divergence of the sides in all directions from the point of the spindle there will be comparatively little in the action of the winds or waves to prevent the vessel from holding its course. In connection with this is the further advantage that water will pass off the vessel easily, there being no flat decks or bulwarks to retain it. This mode of construction will therefore avoid the discomfort and risk arising from shipping seas, to which all quick sailing vessels as heretofore constructed are liable.

Another advantage peculiar to this form of construction is that while the vessel offers the least resistance to external forces tending to roll it, at the same time it opposes the best form of resistance to such forces as tend to injure it, presenting always a complete arch to any external force. Combined with this is the further advantage that for an equal length and area of surface of the whole vessel this form of cross-section includes a greater space than any other could, affording with the least amount of building material the greatest stowage.

Owing to the advantageous form which such a vessel presents laterally to external forces, it may be made, particularly when the longitudinal lines are well selected, of great length, which will have the effect of diminishing its pitching when crossing the waves. This advantage is enhanced by the fact that it is not necessary for a vessel of this form, as it is for those of ordinary construction, that it should pass over the crest of the wave.

We have described the longitudinal section as represented by arcs of circles, but other curves or combinations of curves may be advantageously employed, and, if thought preferable, they may be such that the vessel shall be sharper at one end than at the other, as shown in Fig. 5; or the central portion may be a cylinder and the ends bounded by cones with curved sides, giving a longitudinal section, such as is shown in Fig. 6, or the central portion may be a cylinder and the ends cones with straight sides, giving a longitudinal section similar to that shown in Fig. 7; but we do not deem this to be as good a form as those before mentioned. Where different curves or right lines enter into these longitudinal sections it is best that the curves should meet at a common tangent, and that the straight lines should meet the curves in a direction in which the former are tangent to the latter; but whatever may be the longitudinal lines the condition of the transverse sections, being circular, must be observed. It may also be deemed advisable in some cases to provide the vessel with a keel, which, belonging to the portion almost always immersed, will in no wise affect the above-described properties of the figure of the hull, except that it will tend to check the oscillations of the vessel about its axis and facilitate the steering.

Vessels of this form of hull might be steered in more convenient ways than by the use of the ordinary rudder. One plan for this purpose is as follows: At some suitable point along the length of the vessel, either before or aft the center, a vertical shaft should be passed through a stuffing-box in the bottom or through a pipe projecting from the bottom into the interior above the water-line. At the lower end of this shaft a blade of sufficient size should project, which should be symmetrical on both sides of the axis of the shaft, and sufficiently curved or sloped on its top to enable it to make an entire rotation without touching the curved bottom. More than one such rudder might be provided or placed in different positions. The upper end of the shaft should be connected with a tiller-wheel or other steering apparatus.

For the purposes of access to the interior of the hull and of ventilation, &c., suitable entrances must be provided, which would be best arranged in pipes or towers passing through the upper part of the hull, and reaching to such a distance above as may be deemed most expedient.

For the purposes of facilitating the loading and unloading of the vessel, affording additional ingress and egress, promoting ventilation and lighting the interior, a portion of the top of the hull may be fitted with hatches, dead-lights or other similar contrivances, capable of being opened and closed at pleasure.

We are aware that spindle-shaped bodies, both solid and hollow, have been called boats and have been used as mere floats for various purposes—such, for example, as sustaining a bulky superstructure, as decks for freight and propelling machinery, and cabins for passengers in the navigation of rivers and other still waters; but since such spindle-shaped bodies or boats have never heretofore been by and in themselves adapted to the performance of all the functions of the hull of a vessel for navigating seas—such, for example, as receiving and affording accommodations for propelling machinery, freight, and passengers within themselves, in addition to floating the same—such mere floats cannot perform the office of our hull, and, besides, such floats and their said superstructures must be considered

United States Patent Office

PTO - BOYERS, PA Duty Station

MISSING PAGE TEMPORARY NOTICE

PATENT Re651 FOR ISSUE DATE 1-25-1859

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE p. 3 of tift + rest.

Data Conversion Operation

Boyers, Pa